United States Patent
Kasslin et al.

(10) Patent No.: US 8,775,633 B2
(45) Date of Patent: Jul. 8, 2014

(54) SERVICE INFORMATION EXCHANGE IN WIRELESS NETWORK

(75) Inventors: Mika Kasslin, Espoo (FI); Janne Marin, Espoo (FI); Gabor Bajko, Mountain View, CA (US)

(73) Assignee: Nokia Corporation, Espoo (FI)

( * ) Notice: Subject to any disclaimer, the term of this patent is extended or adjusted under 35 U.S.C. 154(b) by 1077 days.

(21) Appl. No.: 12/499,367

(22) Filed: Jul. 8, 2009

(65) Prior Publication Data

US 2011/0010246 A1    Jan. 13, 2011

(51) Int. Cl.
  G06F 15/16 (2006.01)
  H04W 4/00 (2009.01)
  H04M 3/00 (2006.01)

(52) U.S. Cl.
  USPC .......... 709/227; 709/228; 370/338; 455/419; 455/507

(58) Field of Classification Search
  USPC .......................... 455/41.2, 419, 507; 370/338
  See application file for complete search history.

(56) References Cited

U.S. PATENT DOCUMENTS

| | | | |
|---|---|---|---|
| 6,842,460 B1 | 1/2005 | Olkkonen et al. | |
| 6,909,721 B2 | 6/2005 | Ekberg et al. | |
| 2004/0181575 A1* | 9/2004 | Mallberg et al. | 709/203 |
| 2005/0004995 A1* | 1/2005 | Stochosky | 709/219 |
| 2006/0094360 A1* | 5/2006 | Jung et al. | 455/41.2 |
| 2009/0029728 A1* | 1/2009 | Shen et al. | 455/507 |
| 2010/0287050 A1* | 11/2010 | Jones et al. | 705/14.58 |

FOREIGN PATENT DOCUMENTS

CN    101409907 A    4/2009

OTHER PUBLICATIONS

IEEE P802.11u/TM D7.0 3.0, Jun. 2009; pp. 67-95.
IEEE P802.11u™/D7.0 Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 7: Interworking with External Networks, Prepared by the 802.11 Working Group of the 802 Committee, Jun. 2009.
Wi-Fi Alliance: Press Releases, Wi-Fi Alliance® announces groundbreaking specification to support direct Wi-Fi connections between devices, Oct. 14, 2009.
Peer-to-Peer Technical Specification, Revision 1.0, Wi-Fi Alliance Peer-to-Peer Technical Task Group, May 12, 2009.
Chinese Patent Office Action for Chinese Application No. 201010226961.6 dated Sep. 26, 2012.

* cited by examiner

Primary Examiner — Rupal Dharia
Assistant Examiner — Joe Chacko
(74) Attorney, Agent, or Firm — Locke Lord LLP

(57) ABSTRACT

Method, apparatus, and computer program product embodiments of the invention are disclosed to automatically advertise a change in service offering of a wireless first device in wireless networks. In an example embodiment of the invention, if there is a change in service offering of the first device that is connected to a wireless second device, the first device automatically generates a reassociation request frame and transmits it to the second device. In addition to the standard processing of the reassociation request frame, the second device considers the received reassociation request frame as a trigger to respond by transmitting a generic advertisement service request to the first device. The first device will then have an opportunity to transmit its updated and up-to-date service description to the second device in a generic advertisement service response frame. The second device buffers the first device's updated service description and makes it available to other wireless devices searching the network for services, to facilitate network selection.

13 Claims, 6 Drawing Sheets

| | | P2P CAPABILITY | P2P DEVICE INFO 602 | | EXT. LISTEN TIME |
|---|---|---|---|---|---|
| 600 | REASSOCIATION REQUEST FRAME | ...... | ...... | ...... | TRIGGERING FIELD 604 | ...... |

TRIGGERING FIELD 604 SENT IN THE REASSOCIATION REQUEST FRAME BY THE CLIENT DEVICE, IS USED TO TRIGGER A GENERIC ADVERTISEMENT SERVICE REQUEST FRAME IN THE GROUP OWNER DEVICE

SERVICE INFORMATION EXCHANGE IN WIRELESS NETWORK

FIELD

The embodiments relate to wireless communication, and more particularly to improvements in advertising a change in service offering of a client device in wireless networks.

BACKGROUND

Wireless communication devices continue to proliferate due, in part, to technological advances that have improved both Quality of Service (QoS) and functionality. As a result, these devices have become commonplace for both personal and business use, allowing users to transmit and receive voice, text, and graphical data from various locations. The wireless networks by which these exchanges may be executed span different frequencies and ranges.

A technical specification entitled "Peer-to-Peer Technical Specification" is currently being developed by the Wi-Fi Alliance™ to define an architecture and set of protocols of a peer-to-peer (P2P) solution for Wi-Fi device-to-device connectivity. A wireless P2P network is formed by an AP-like wireless device that is called a P2P Group Owner (GO). The P2P GO builds up a P2P Group to which wireless P2P client devices can join. The P2P Clients connect to the P2P GO in the same manner that they would associate with an access point (AP) in Wi-Fi infrastructure network. The Wi-Fi Alliance P2P specification provides some functional optimizations to the basic Wi-Fi operations to address unique needs of device-to-device networking. One such optimization is related to network discovery and selection, for which a concept called layer 2 service discovery (L2SD) has been proposed. The L2SD mechanism is intended to help a searching P2P device decide whether to join a P2P Group that it has found. The L2SD mechanism is proposed to use the Generic Advertisement Service (GAS) protocol/frame exchange, as defined in the IEEE P802.11u™/D7.0, Draft Standard, June 2009. The P2P GO uses the GAS mechanism to gather information about services available in the P2P Group. The P2P GO can then provide service information compiled from all of the P2P clients in the group, to searching P2P devices to facilitate their network selection. In a P2P Group, services are typically provided by P2P Client devices that may have multiple services and the services may be dynamic, in that they are not available all the time when the P2P Client device is associated with the P2P GO. When a P2P client device changes its service offerings, it does not automatically report the updated service offering to the P2P GO.

The document entitled "Peer-to-Peer Technical Specification", Wi-Fi Alliance, dated May 12, 2009, is incorporated herein by reference. The IEEE P802.11u™/D7.0 Draft entitled "Standard for Information Technology—Telecommunications and information exchange between systems—Local and metropolitan area networks—Specific requirements Part 11: Wireless LAN Medium Access Control (MAC) and Physical Layer (PHY) specifications", dated June 2009, is incorporated herein by reference.

SUMMARY

Method, apparatus, and computer program product embodiments of the invention are disclosed to automatically advertise a change in service offering of a wireless first device in wireless networks. In an example embodiment of the invention, if there is a change in service offering of the first device that is connected to a wireless second device, the first device automatically generates a reassociation request frame and transmits it to the second device. In addition to the standard processing of the reassociation request frame, the second device considers the received reassociation request frame as a trigger to respond by transmitting a generic advertisement service request to the first device.

In example embodiments of the invention, the reassociation request frame may contain a field used to trigger a generic advertisement service request from the second. The triggering field is included to indicate whether the second should send a generic advertisement service request. For example, the triggering field may be set to '1' to trigger a generic advertisement service request and may be set to '0' to indicate that the reassociation request frame was sent for some other reason than a change in service offering.

The first device will then have an opportunity to transmit its updated and up-to-date service description to the second device in a generic advertisement service response frame. The second device buffers the first device's updated service description and makes it available to other wireless devices searching the network for services, to facilitate network selection.

In example embodiments of the invention, if there is a change in service offering of a peer-to-peer client device that is connected to a peer-to-peer wireless group owner device, the client device automatically generates a reassociation request frame and transmits it to the group owner device. In addition to the standard processing of the reassociation request frame, the group owner device considers the received reassociation request frame as a trigger to respond by transmitting a generic advertisement service request to the client device.

In an example embodiment of the invention, the reassociation request frame may contain a field used to trigger a generic advertisement service request from the group owner. The triggering field is included in the P2P Device Info subelement present in reassociation request frames, to indicate whether the group owner should send a generic advertisement service request. For example, the triggering field is set to '1' to trigger a generic advertisement service request and is set to '0' to indicate that the reassociation request frame was sent for some other reason than a change in service offering.

The client device will then have an opportunity to transmit its updated and up-to-date service description to the group owner device in a generic advertisement service response frame. The group owner device buffers the client device's updated service description and makes it available to other peer-to-peer wireless client devices searching the network for services, to facilitate network selection.

In example embodiments of the invention, a method comprises:

changing a service offering in a device that is wirelessly connected to a second device;

generating in the first device a reassociation request frame in response to the change in the service offering;

transmitting the reassociation request frame to the second device;

receiving from the second device a generic advertisement service request in response to the transmitted reassociation request frame; and transmitting a generic advertisement service response frame to the second device, with an updated service description corresponding to the change in the service offering.

In example embodiments of the invention, an apparatus comprises:

a processor configured to change a service offering;

said processor further configured to generate a reassociation request frame in response to the change in the service offering;

a transceiver configured to transmit the reassociation request frame to a wirelessly connected device;

said transceiver further configured to receive from the wirelessly connected device, a generic advertisement service request in response to the transmitted reassociation request frame; and said transceiver further configured to transmit a generic advertisement service response frame to the wirelessly connected device, with an updated service description corresponding to the change in the service offering.

In example embodiments of the invention, a computer readable medium storing program instructions, which when executed by a computer processor, performs the steps comprising:

changing a service offering in a device that is wirelessly connected to a second device;

generating a reassociation request frame in response to the change in the service offering;

transmitting the reassociation request frame to the second device;

receiving from the second device a generic advertisement service request in response to the transmitted reassociation request frame; and transmitting a generic advertisement service response frame to the second device, with an updated service description corresponding to the change in the service offering.

In example embodiments of the invention, a method comprises:

forming a wireless network with one or more devices;

receiving a reassociation request frame from at least one of the one or more devices;

transmitting to said at least one device a generic advertisement service request in response to the received reassociation request frame;

receiving a generic advertisement service response frame from said at least one device, with an updated service description; and storing the updated service description.

In example embodiments of the invention, an apparatus comprises:

a processor configured to form a network with one or more devices;

a transceiver configured to receive a reassociation request frame from at least one of the one or more devices;

said transceiver further configured to transmit to said at least one device a generic advertisement service request in response to the received reassociation request frame;

said transceiver further configured to receive a generic advertisement service response frame from said at least one device, with an updated service description; and said processor further configured to store the updated service.

In example embodiments of the invention, a computer readable medium storing program instructions, which when executed by a computer processor, performs the steps comprising:

forming a wireless network with one or more devices;

receiving a reassociation request frame from at least one of the one or more devices;

transmitting to said at least one device a generic advertisement service request in response to the received reassociation request frame;

receiving a generic advertisement service response frame from said at least one device, with an updated service description; and storing the updated service description.

In example embodiments of the invention, the reassociation request frame includes a trigger field to trigger the second device to issue the generic advertisement service request.

In example embodiments of the invention, the first device may be a peer-to-peer wireless client device and the second device may be a peer-to-peer wireless group owner device in a peer-to-peer wireless network. In this manner, changes in service offering of a peer-to-peer client device may be advertised in peer-to-peer networks.

DISCUSSION OF EXAMPLE EMBODIMENTS

Figure 1:
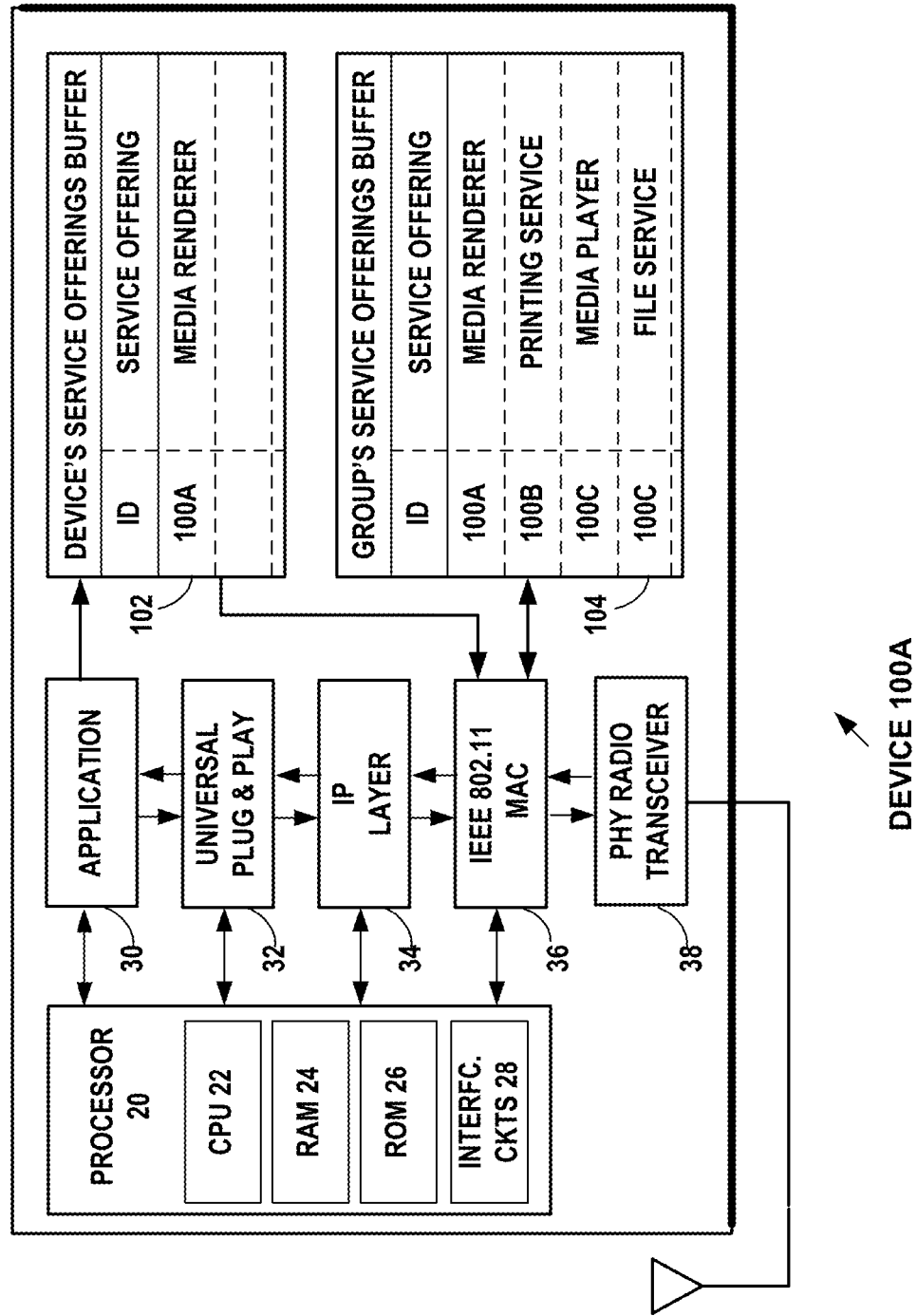
FIG. 1 illustrates an example embodiment of a peer-to-peer wireless device in an example embodiment of a peer-to-peer wireless network shown in FIG. 2.
Figure 2:
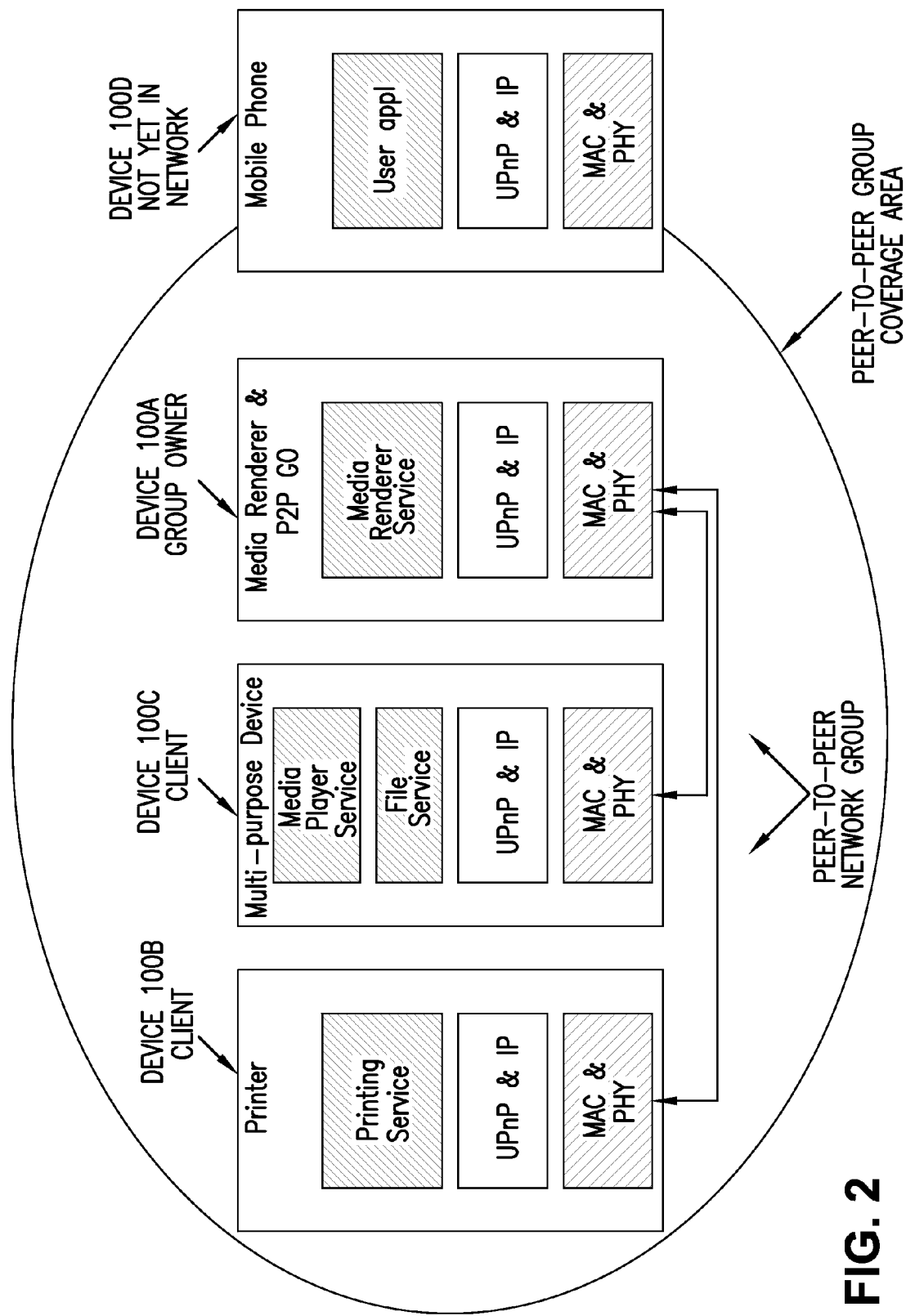
FIG. 2 illustrates an example embodiment of a peer-to-peer wireless network.
Figure 5:
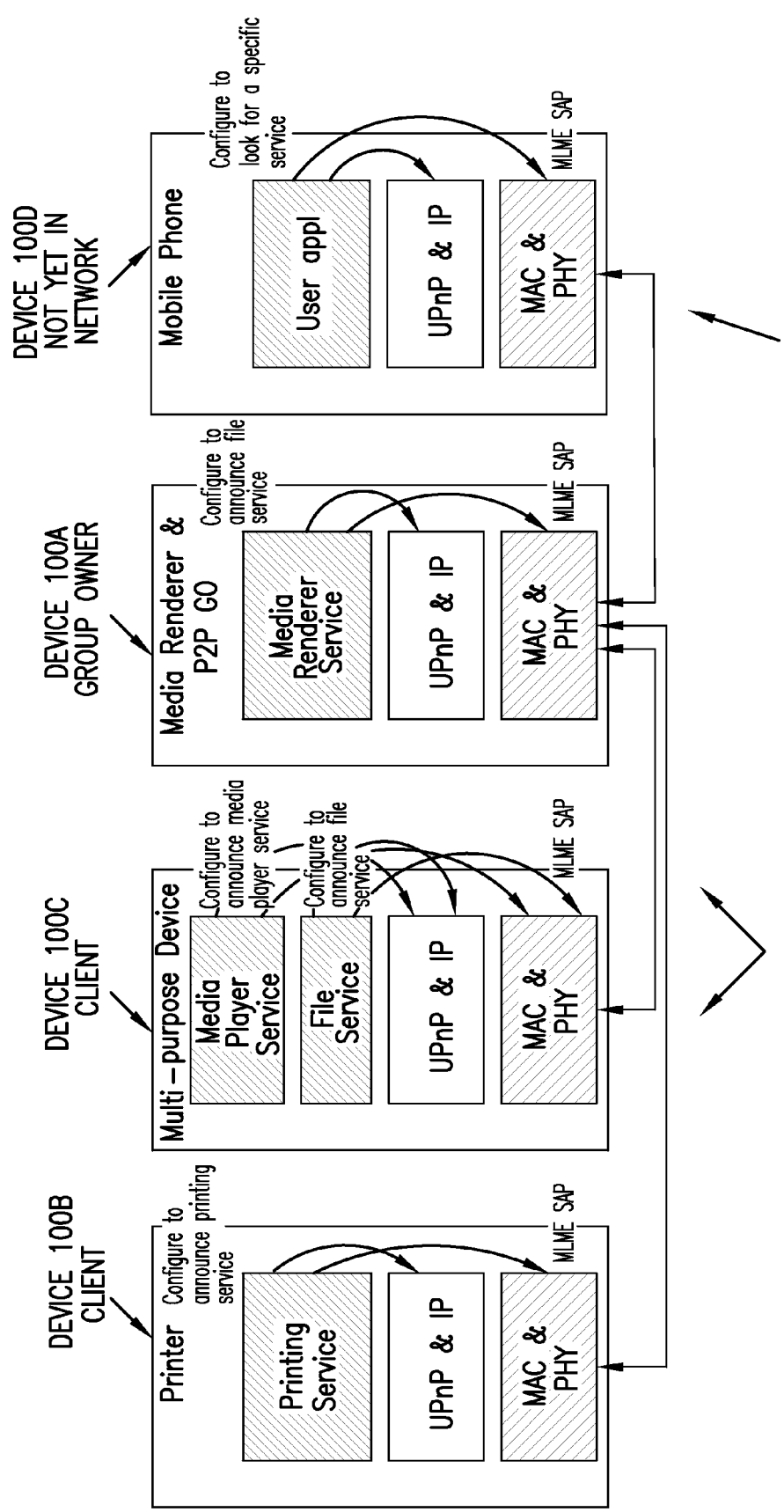
FIG. 5 illustrates an example embodiment of a peer-to-peer wireless network of FIG. 2, wherein generic advertisement service request and response frames are exchanged in the peer-to-peer Group. When a client device needs to provide an updated service description to the group owner device, it issues a Reassociation Request frame to the group owner device that is responsible for issuing a generic advertisement service request to the client.

FIG. 1 illustrates an example embodiment of a peer-to-peer (P2P) wireless device 100A in an example embodiment of a P2P wireless network shown in FIG. 2 and in FIG. 5. The several P2P wireless devices 100B, 100C, and 100D shown in FIG. 2 may each have substantially the same organization and components shown for the wireless device 100A of FIG. 1. Any of the P2P wireless devices 100A, 100B, 100C, and 100D may function at a particular time as either a P2P client device or a P2P group owner device. As shown in FIG. 2, P2P wireless device 100A offers a media rendering service, P2P wireless device 100B offers a printing service, P2P wireless device 100C offers a media player service, and P2P wireless device 100D is a mobile phone. P2P wireless devices 100A, 100B, and 100C currently belong to the same P2P network group and P2P wireless device 100D is P2P capable, but it is not yet in the network. P2P wireless device 100A is the P2P group owner, P2P wireless device 100B is a P2P client, and P2P wireless device 100C is a P2P client. All of the devices use Universal Plug and Play (UPnP) networking protocols published by the UPnP Forum, enabling devices to automatically announce their network address and supported device and services types to other devices in the network.

Generally, each P2P wireless device 100A, 100B, 100C, and 100D includes a processor 20, an IEEE 802.11 wireless network MAC 36, and a transceiver 38. The device's service offerings buffer 102 stores the current description of the service offerings of the device, which may be written into the buffer 102 by the processor 20. In embodiments of the P2P wireless device, such as device 100B functioning as a P2P client device offering a printing service, the processor 20 is configured to make changes, when necessary, to a service offering in the device's service offerings buffer 102. This change in a service offering may be, for example, changing the offered paper sizes available in the printer device. The change in the service offering is written into the P2P client device's buffer 102. In order to enable rapidly providing a notice to other devices of the changes in the service offering, the processor 20 is configured to automatically generate a reassociation request frame. The MAC 36 and transceiver 38 of the P2P client device are configured to transmit the reassociation request frame to the group owner device 100A. The MAC 36 and transceiver 38 of the P2P client device are further configured to receive from the group owner device 100A, a generic advertisement service request in response to the reassociation request frame. The MAC 36 and transceiver 38 of the P2P client device are further configured to transmit a generic advertisement service response frame to the group owner device 100A, with the updated service description. The group owner device 100A buffers the client device's updated service description and makes it available to other peer-to-peer wireless devices searching the network for services, to facilitate network selection.

The Generic Advertisement Service (GAS) protocol/frame exchange, is defined in the IEEE P802.11u™/D7.0, Draft Standard, June 2009, referred to above. Generic Advertisement Service is an IEEE 802.11 service that provides wireless frames of higher-layer advertisements between devices. In response to a generic advertisement service request from a non-access point device, the service responds with a generic advertisement service response frame that reports information related to the request and associated protocol.

The several P2P wireless devices 100A, 100B, 100C, and 100D shown in the network of FIG. 2 may be mobile communications devices, PDAs, cell phones, laptops or palmtop computers, or the like. The wireless devices may also be integrated components of a vehicle, such as an automobile, bicycle, airplane or other mobile conveyance. The wireless devices may also be stationary devices located in a kiosk, service center, office, or the like.

Each P2P wireless device 100A, 100B, 100C, and 100D includes a processor 20, which includes a central processing unit (CPU) 22, a random access memory (RAM) 24, a read only memory (ROM) or programmable read only memory (PROM) 26, and interface circuits 28 to interface with a key pad, display, optional microphone, speakers, ear pieces, and camera or other imaging devices, etc. The RAM 24 and PROM 26 may be removable memory devices such as smart cards, Subscriber Identity Modules (SIMs), Wireless Application Protocol Identity Modules (WIMs), semiconductor memories such as a RAM, ROM, or PROM, flash memory devices, etc. The Medium Access Control (MAC) Layer 36, IP layer 34, and Universal Plug and Play layer 32 of the protocol stack of the wireless device and/or application program 30 may be embodied as program logic stored in the RAM 24 and/or PROM 26 in the form of sequences of programmed instructions which may be executed in the CPU 22, carry out the functions of the disclosed embodiments. The program logic may be delivered to the writeable RAM, PROM, flash memory device, etc. 24 of the wireless device from a computer program product or article of manufacture in the form of computer-usable media such as resident memory devices, smart cards or other removable memory devices, or in the form of program logic transmitted over any transmitting medium which transmits such a program. Alternately, the MAC Layer 36, IP layer 34, and Universal Plug and Play layer 32 of the protocol stack and/or application program 30 may be embodied as integrated circuit logic in the form of programmed logic arrays or custom designed application specific integrated circuits (ASIC). The transceiver 38 in wireless device operates in accordance with the network protocol of the wireless device. The MAC layer 36 may operate using, for example the IEEE 802.11 wireless LAN standard, for example as specified above.

In embodiments of the P2P wireless device, such as device 100A functioning as a P2P group owner device, the processor 20 is configured to form a peer-to-peer network with a peer-to-peer wireless client device such as 100B and 100C. The group owner device 100A compiles the current service descriptions of all of the P2P wireless device 100A, 100B, and 100C in the group's service offerings buffer 104. The MAC 36 and transceiver 38 are configured to receive a reassociation request frame from the P2P client device 100B to start the process of advertising the client's changed service description. The MAC 36 and transceiver 38 are further configured to transmit to the P2P client device 100B a generic advertisement service request in response to the reassociation request frame. The MAC 36 and transceiver 38 are further configured to receive a generic advertisement service response frame from the client P2P device 100B, with the updated service description. The group owner device 100A updates the group's service offerings buffer 104 with the changed service description received from the client device 100B in the generic advertisement service response frame. The processor 20 is further configured to provide the updated service description to another P2P client device 100D searching the network, to facilitate network selection.

Figure 3:
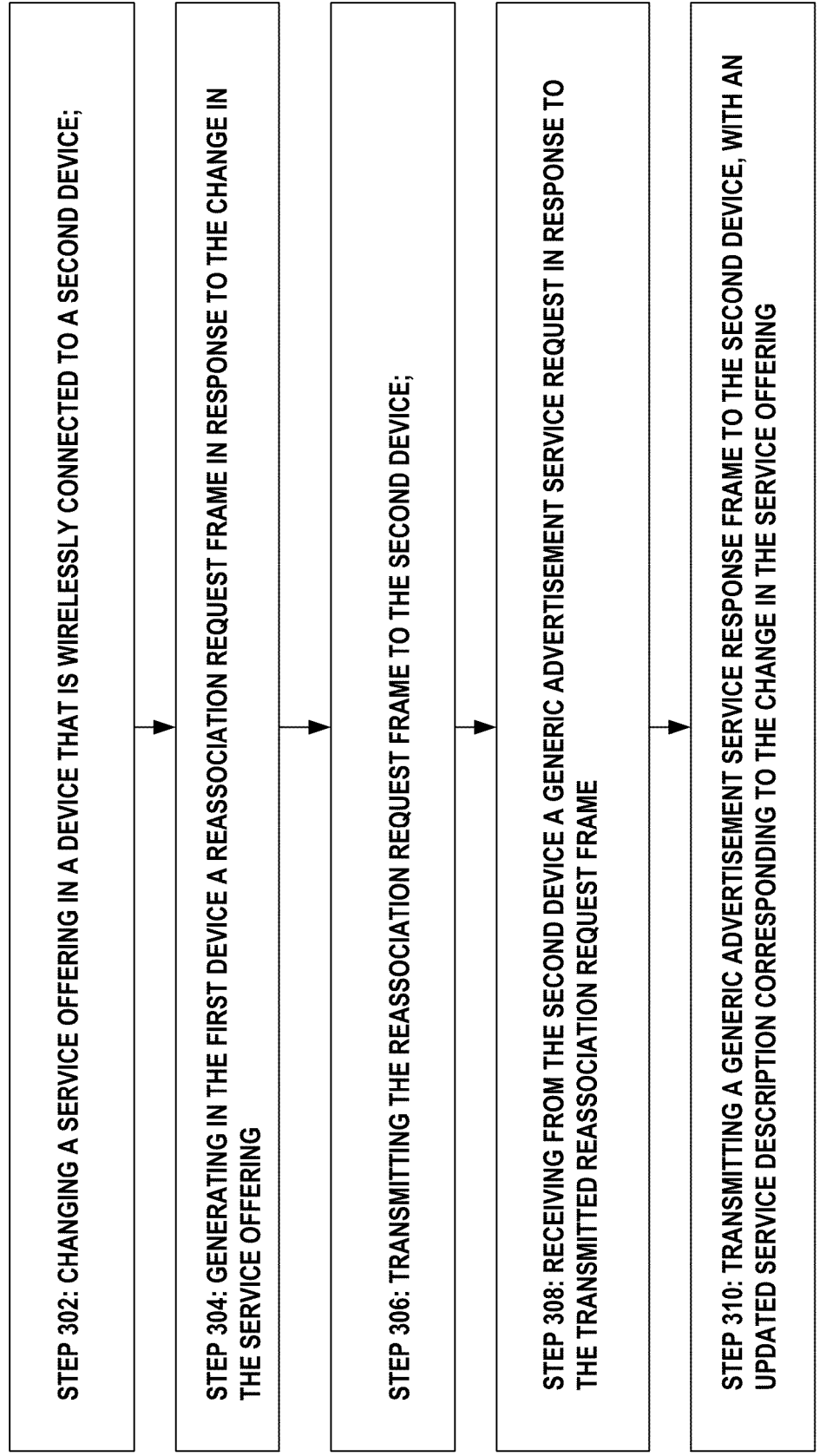
FIG. 3 illustrates an example embodiment of a flow diagram for the process in a peer-to-peer wireless client device.

FIG. 3 illustrates an example embodiment of a flow diagram 300 for the process in a wireless P2P client device. FIG. 3 is an example of steps in the procedure 300 carried out by a wireless device in executing-in-place program code stored in the memory of the wireless device. The steps in the procedure of the flow diagram may be embodied as program logic stored in the memory of the wireless device of FIG. 1 in the form of sequences of programmed instructions which, when executed in the microprocessor control logic of the wireless device of FIG. 1, carry out the functions of an exemplary disclosed embodiment. The steps in the procedure 300 are as follows:

Step 302: changing a service offering in a device that is wirelessly connected to a second device;

Step 304: generating in the first device a reassociation request frame in response to the change in the service offering;

Step 306: transmitting the reassociation request frame to the second device;

Step 308: receiving from the second device a generic advertisement service request in response to the transmitted reassociation request frame; and Step 310: transmitting a generic advertisement service response frame to the second device, with an updated service description corresponding to the change in the service offering.

Figure 6:
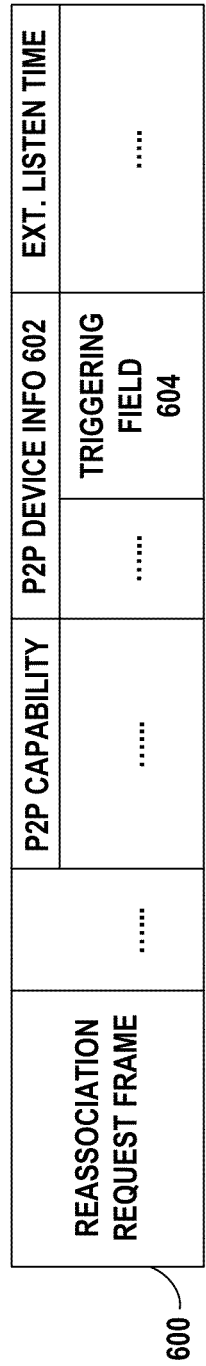
FIG. 6 illustrates an example embodiment of a reassociation request frame that contains a triggering field used to trigger a generic advertisement service request from the group owner.

In an example embodiment of the invention for an example P2P wireless network, the reassociation request frame 600 generated in step 304 by the client device and shown in FIG. 6, contains a one octet field 604 used to trigger a generic advertisement service request frame in the group owner. As shown in FIG. 6, the triggering field 604 is included in the P2P Device Info subelement 602 present in reassociation request frames 600, to indicate whether the group owner should send a generic advertisement service request. For example, the triggering field 604 is set to '1' to trigger a generic advertisement service request and is set to '0' to indicate that the reassociation request frame 600 was sent for some other reason than a change in service offering.

Figure 4:
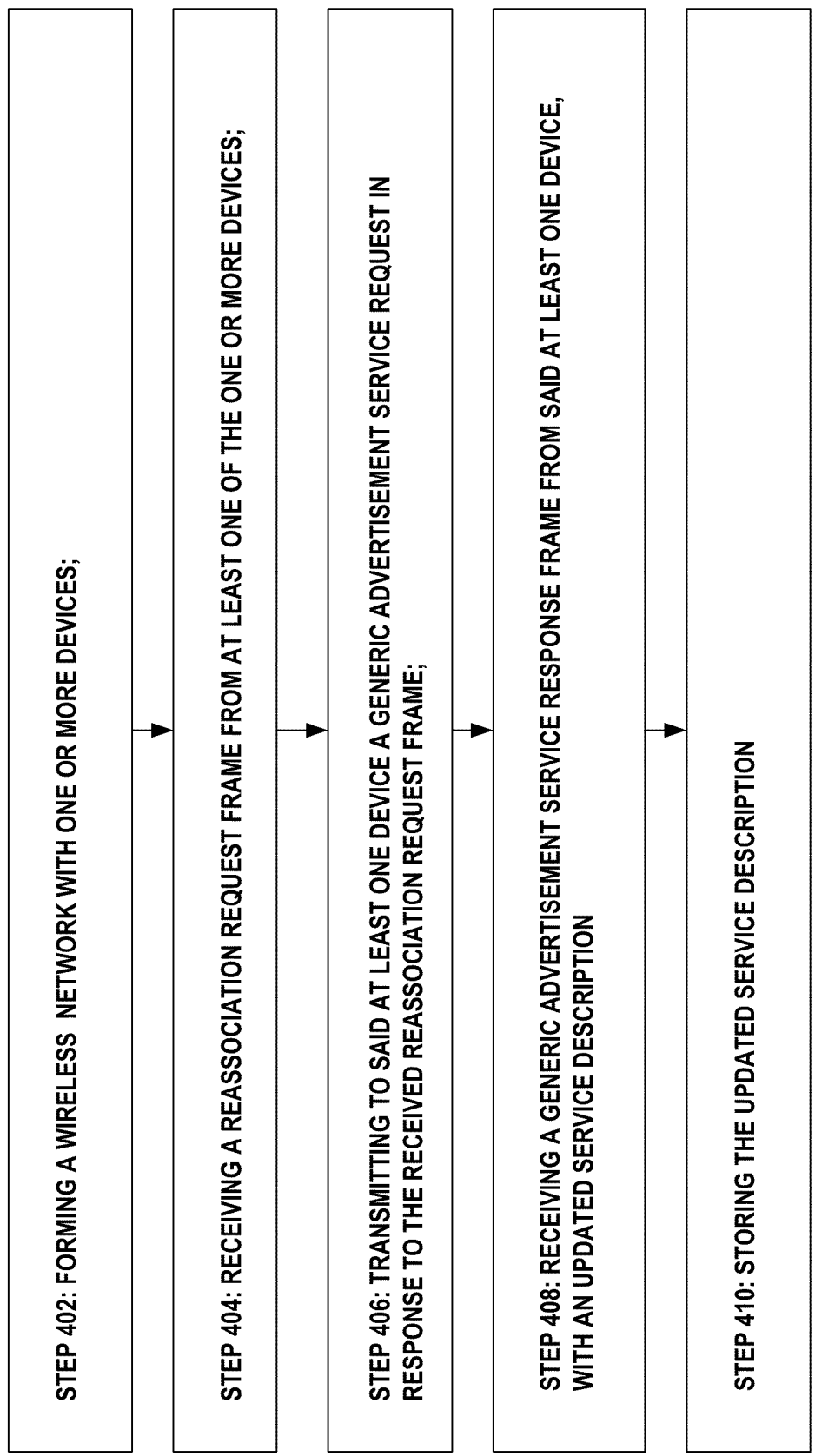
FIG. 4 illustrates an example embodiment of a flow diagram for the process in a peer-to-peer wireless group owner device.

FIG. 4 illustrates an example embodiment of a flow diagram 400 for the process in a wireless P2P group owner device. FIG. 4 is an example of steps in the procedure 400 carried out by a wireless device in executing-in-place program code stored in the memory of the wireless device. The steps in the procedure of the flow diagram may be embodied as program logic stored in the memory of the wireless device of FIG. 1 in the form of sequences of programmed instructions which, when executed in the microprocessor control logic of the wireless device of FIG. 1, carry out the functions of an exemplary disclosed embodiment. The steps in the procedure 400 are as follows:

Step 402: forming a wireless network with one or more devices;

Step 404: receiving a reassociation request frame from at least one of the one or more devices;

Step 406 transmitting to said at least one device a generic advertisement service request in response to the received reassociation request frame;

Step 408: receiving a generic advertisement service response frame from said at least one device, with an updated service description. In an example P2P wireless network, the P2P group owner device updates the group's service offerings buffer with the changed service description received from the P2P client device in the generic advertisement service response frame.

Step 410: storing the updated service description. In an example embodiment of the invention for an example P2P wireless network, the reassociation request frame 600 received in step 404 by the group owner device and shown in FIG. 6, contains a one octet field 604 used to trigger a generic advertisement service request frame from the group owner. As shown in FIG. 6, the triggering field 604 is included in the P2P Device Info subelement 602 present in reassociation request frames 600, to indicate whether the group owner should send a generic advertisement service request. For example, the triggering field 604 is set to '1' to trigger a generic advertisement service request and is set to '0' to indicate that the reassociation request frame 600 was sent for some other reason than a change in service offering.

FIG. 5 illustrates an example embodiment of a P2P wireless network of FIG. 2, wherein generic advertisement service (GAS) request and response frames are exchanged in the P2P Group. When a P2P client 100C needs to automatically provide an updated service description to the P2P group owner (GO) 100A, it transmits a Reassociation Request frame to the GO 100A that is responsible for replying by issuing a GAS request to the client 100C.

A printer device 100B, a multi-purpose device 100C, and a media renderer device 100A belong to the same Wi-Fi P2P network/group in which the renderer device 100A is the Group Owner (GO). Mobile phone device 100D is P2P capable, but it is not yet in the network. All the devices use Universal Plug and Play (UPnP). Media Access Control (MAC) Sublayer Management Entity (MLME) Service Access Point (SAP) manages the wireless LAN MAC, including layer 2 service discovery (L2SD) support.

a) In this example, the file service in the multi-purpose P2P client device 100C is no longer available and the service description is updated in the client device 100C to reflect this change. The event of the service update causes the multi-purpose client device 100C to automatically transmit a Reassocation Request frame to the P2P group owner (GO) device 100A. The group owner (GO) device 100A responds to the Reassocation Request frame by transmitting a generic advertisement service (GAS) request to the client device 100C. The P2P client device 100C responds to the generic advertisement service (GAS) request by transmitting a generic advertisement service(GAS) response frame to the group owner device 100A, with the updated service description. The compiled service list for the group in the group's service offerings buffer 104 of the group owner (GO) 100A is then updated shortly after the service had been deactivated in the multi-purpose client device 100C.

b) When the user of the mobile phone 100D searches for networks with a file service, it finds the P2P Group. The group owner (GO) 100A advertises with L2SD, the updated, compiled table in buffer 104 of the group's service offerings. The updated, compiled table indicates that there is only a printing service in device 100B, media player service in device 100C and renderer service in device 100A available. Because there is no longer a file service available in device 100C or anywhere in the group, the user of the mobile phone 100D decides to continue the search elsewhere.

c) The user of the mobile phone 100D finds a file service in another network at a later time and did not have to waste any time in the P2P Group with outdated service information from the group owner (GO) 100A.

Although the example embodiments of the invention disclosed herein are mainly written in the context of peer-to-peer (P2P) networks, the principles of the embodiments are also applicable to other types of networks.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention. For instance, the features described herein may be employed in networks other than Wireless LAN networks.

What is claimed is

1. A method, comprising:
changing a service offering in a device that is wirelessly connected to a second device;
generating in the first device a reassociation request frame including a dedicated field including a selectable indication, the selectable indication capable of being set to a first value to trigger a generic advertisement service request or to a second value to indicate that the reassociation request frame was sent for some other reason than a change in service offering, the reassociation request frame being generated in response to the change in the service offering, including the selectable indication being set to the first value to trigger the second device to issue the generic advertisement service request;

transmitting the reassociation request frame to the second device;

receiving from the second device a generic advertisement service request in response to the transmitted reassociation request frame; and transmitting a generic advertisement service response frame to the second device, with an updated service description corresponding to the change in the service offering.

2. The method of claim 1, further comprising:
said device being a peer-to-peer wireless client device and said second device being a peer-to-peer wireless group owner device in a peer-to-peer wireless network.

3. An apparatus, comprising:
a hardware processor configured to change a service offering;
said processor further configured to generate a reassociation request frame including a dedicated field including a selectable indication, the selectable indication capable of being set to a first value to trigger a generic advertisement service request or to a second value to indicate that the reassociation request frame was sent for some other reason than a change in service offering, the reassociation request frame being generated in response to the change in the service offering, including the selectable indication being set to the first value to trigger a wirelessly connected device to issue the generic advertisement service request;
a transceiver configured to transmit the reassociation request frame to the wirelessly connected device;
said transceiver further configured to receive from the wirelessly connected device, a generic advertisement service request in response to the transmitted reassociation request frame; and
said transceiver further configured to transmit a generic advertisement service response frame to the wirelessly connected device, with an updated service description corresponding to the change in the service offering.

4. The apparatus of claim 3, further comprising:
said apparatus device being a peer-to-peer wireless client device and said wirelessly connected device being a peer-to-peer wireless group owner device in a peer-to-peer wireless network.

5. A computer readable non-transitory medium storing program instructions, which when executed by a computer processor, perform the steps comprising:
changing a service offering in a device that is wirelessly connected to a second device;
generating a reassociation request frame including a dedicated field including a selectable indication, the selectable indication capable of being set to a first value to trigger a generic advertisement service request or to a second value to indicate that the reassociation request frame was sent for some other reason than a change in service offering, the reassociation request frame being generated in response to the change in the service offering, including the selectable a indication being set to the first value to trigger the second device to issue the generic advertisement service request;

transmitting the reassociation request frame to the second device;

receiving from the second device a generic advertisement service request in response to the transmitted reassociation request frame; and transmitting a generic advertisement service response frame to the second device, with an updated service description corresponding to the change in the service offering.

6. A method, comprising:
forming by a device, a wireless network with one or more devices;
receiving by the device, a reassociation request frame from at least one of the one or more devices, including a dedicated field including a selectable indication, the selectable indication capable of being set to a first value to trigger a generic advertisement service request or to a second value to indicate that the reassociation request frame was sent for some other reason than a change in service offering, the reassociation request frame being received, including the selectable indication being set to the first value to trigger the device to issue a generic advertisement service request;
transmitting by the device, to said at least one device a generic advertisement service request in response to the received reassociation request frame;
receiving by the device, a generic advertisement service response frame from said at least one device, with an updated service description;
storing by the device, the updated service description, and
providing by the device, the stored updated service description to any device requesting such information.

7. The method of claim 6, further comprising:
said device being a peer-to-peer wireless group owner device and said at least one device being a peer-to-peer wireless client device in a peer-to-peer wireless network.

8. An apparatus, comprising:
a hardware processor;
a memory; and
a transceiver configured to form a network with one or more devices;
said transceiver further configured to receive a reassociation request frame from at least one of the one or more devices, including a dedicated field including a selectable indication, the selectable indication capable of being set to a first value to trigger a generic advertisement service request or to a second value to indicate that the reassociation request frame was sent for some other reason than a change in service offering, the reassociation request frame being received, including the selectable indication being set to the first value to trigger the apparatus to issue a generic advertisement service request;
said transceiver further configured to transmit to said at least one device a generic advertisement service request in response to the received reassociation request frame;
said transceiver further configured to receive a generic advertisement service response frame from said at least one device, with an updated service description;
said processor further configured to cause the memory to store the updated service description; and
said transceiver further configured to provide the stored updated service description to any device requesting such information.

9. The apparatus of claim 8, further comprising:
said apparatus being a peer-to-peer wireless group owner device and said at least one device being a peer-to-peer wireless client device in a peer-to-peer wireless network.

10. A computer readable non-transitory medium storing program instructions, which when executed by a computer processor, perform the steps comprising:
forming by a device, a wireless network with one or more devices;
receiving by the device, a reassociation request frame from at least one of the one or more devices, including a dedicated field including a selectable indication, the selectable indication capable of being set to a first value to trigger a generic advertisement service request or to a second value to indicate that the reassociation request frame was sent for some other reason than a change in service offering, the reassociation request frame being received, including the selectable indication being set to the first value to trigger the device to issue a generic advertisement service request;
transmitting by the device, to said at least one device a generic advertisement service request in response to the received reassociation request frame;
receiving by the device, a generic advertisement service response frame from said at least one device, with an updated service description;
storing by the device, the updated service description; and
providing by the device, the stored updated service description to any device requesting such information.

11. The computer readable medium of claim 10, further comprising:
said computer processor being in a device that is a peer-to-peer wireless group owner device and said at least one device being a peer-to-peer wireless client device in a peer-to-peer wireless network.

12. An apparatus, comprising:
a hardware processor;
at least one memory including at least one computer program code;
the at least one memory and the at least one computer program code configured to, with the processor, cause the apparatus at least to:
change a service offering;
generate a reassociation request frame including a dedicated field including a selectable indication, the selectable indication capable of being set to a first value to trigger a generic advertisement service request or to a second value to indicate that the reassociation request frame was sent for some other reason than a change in service offering, the reassociation request frame being generated in response to the change in the service offering, including the selectable a indication being set to the first value to trigger a device receiving the request frame, to issue a generic advertisement service request;
transmit the reassociation request frame to a wirelessly connected device;
receive a generic advertisement service request from the wirelessly connected device in response to the transmitted reassociation request frame; and
transmit a generic advertisement service response frame to the wirelessly connected device, with an updated service description corresponding to the change in the service offering.

13. An apparatus, comprising:
a hardware processor;
at least one memory including at least one computer program code;
the at least one memory and the at least one computer program code configured to, with the processor, cause the apparatus at least to:
form a network with one or more devices;
receive a reassociation request frame from at least one of the one or more devices, including a dedicated field including a selectable indication, the selectable indication capable of being set to a first value to trigger a generic advertisement service request or to a second value to indicate that the reassociation request frame was sent for some other reason than a change in service offering, the reassociation request frame being received, including the selectable indication being set to the first value to trigger the apparatus to issue a generic advertisement service request;
transmit a generic advertisement service request to said at least one device in response to the received reassociation request frame;
receive a generic advertisement service response frame from said at least one device, with an updated service description;
store in the at least one memory the updated service description; and
said processor further configured to provide the stored updated service description to any device requesting such information.

* * * * *